United States Patent
Li

(10) Patent No.: US 7,460,119 B2
(45) Date of Patent: Dec. 2, 2008

(54) INVISIBLE SPACE SKIPPING WITH ADAPTIVE GRANULARITY FOR TEXTURE-BASED VOLUME RENDERING

(75) Inventor: Wei Li, East Brunswick, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 453 days.

(21) Appl. No.: 11/235,408

(22) Filed: Sep. 26, 2005

(65) Prior Publication Data
US 2006/0164410 A1 Jul. 27, 2006

Related U.S. Application Data

(60) Provisional application No. 60/647,712, filed on Jan. 27, 2005.

(51) Int. Cl.
*G06T 15/40* (2006.01)
(52) U.S. Cl. .................................... 345/421
(58) Field of Classification Search ............... None
See application file for complete search history.

(56) References Cited

U.S. PATENT DOCUMENTS

| | | | | |
|---|---|---|---|---|
| 4,835,712 A | * | 5/1989 | Drebin et al. | 345/423 |
| 4,985,856 A | * | 1/1991 | Kaufman et al. | 345/424 |
| 5,381,518 A | * | 1/1995 | Drebin et al. | 345/424 |
| 6,304,266 B1 | * | 10/2001 | Li | 345/424 |
| 6,654,012 B1 | * | 11/2003 | Lauer et al. | 345/424 |
| 6,674,430 B1 | * | 1/2004 | Kaufman et al. | 345/419 |
| 6,735,343 B2 | * | 5/2004 | Michael | 382/241 |
| 7,164,420 B2 | * | 1/2007 | Ard | 345/423 |
| 2002/0190984 A1 | * | 12/2002 | Seiler et al. | 345/424 |
| 2003/0151604 A1 | * | 8/2003 | Kaufman et al. | 345/419 |

OTHER PUBLICATIONS

LaMar et al. Multiresolution Techniques for Interactive Texture-based Volume Visualization. Proceedings of the 10th IEEE Visualization 1999 Conference. 1999.*
Yagel et al. Accelerating Volume Animation by Space-Leaping. Proceedings of the 4th Conference on Visualization '93. 1993. pp. 62-69.*
Guthe et al. Interactive Rendering of Large Volume Data Sets. Proceedings of IEEE Visualization '02. 2002. pp. 53-59.*

(Continued)

*Primary Examiner*—Kee M Tung
*Assistant Examiner*—Peter-Anthony Pappas
(74) *Attorney, Agent, or Firm*—Donald B. Pachburg; F. Chau & Associates, LLC

(57) ABSTRACT

A method of accelerating texture-based volume rendering is provided. The method includes the following steps. A plurality of levels of granularity comprising a plurality of sub-volumes organized in a hierarchical structure are built. The hierarchical structure is ordered top-down from a coarsest level of granularity to a finest level of a granularity. A visibility factor is determined for each of the plurality of sub-volumes. The visibility factor represents a ratio of visible voxels in the corresponding sub-volume. The plurality of sub-volumes are traversed top-down from the coarsest level of granularity to the finest level of granularity. While traversing each of the plurality of sub-volumes, the corresponding sub-volume is rendered and all children of the rendered sub-volume are skipped, if the visibility factor is greater than given threshold.

14 Claims, 5 Drawing Sheets

| Viewing parameter | Associated property | | | | |
|---|---|---|---|---|---|
| | Opaqueness | Segmentedness | Unclippedness | Uncroppedness | Unoccludedness |
| Clip planes | | | ✓ | | ✓ |
| Crop box | | | | ✓ | ✓ |
| Transfer function | ✓ | | | | ✓ |
| Viewing direction | | | | | ✓ |
| 3D mask | | ✓ | | | ✓ |

OTHER PUBLICATIONS

Levoy. Efficient Ray Tracing of Volume Data. ACM Transactions on Graphics. vol. 9, Issue 3. Jul. 1990. pp. 245-261.*

Rezk-Salama et al. Interactive Volume Rendering on Standard PC Graphics Hardware Using Multi-Textures and Multi-Stage Rasterization. 2002.*

Li et al. Accelerating Volume Rendering with Texture Hulls. Proceedings of the 2002 IEEE Symposium on Volume Visualization and Graphics. 2002. pp. 115-122.*

Li et al. Empty Space Skipping and Occlusion Clipping for Texture-Based Volume Rendering. Proceedings of the 14th IEEE Visualization 2003. 2003. pp. 317-324.*

Boada et al. Multiresolution Volume Visualization with a Texture-Based Octree. The Visual Computer. 2001. pp. 185-197.*

Li et al. Texture Partitioning and Packing for Accelerating Texture-based Volume Rendering. Graphics Interface. 2003.*

* cited by examiner

| Viewing parameter | Associated property | | | | | |
|---|---|---|---|---|---|---|
| | Unoccludedness | ✓ | ✓ | ✓ | ✓ | ✓ |
| | Uncroppedness | | ✓ | | | |
| | Unclippedness | ✓ | | | | |
| | Segmentedness | | | | ✓ | |
| | Opaqueness | | | ✓ | | |
| | | Clip planes | Crop box | Transfer function | Viewing direction | 3D mask |

FIG. 3

INVISIBLE SPACE SKIPPING WITH ADAPTIVE GRANULARITY FOR TEXTURE-BASED VOLUME RENDERING

CROSS-REFERENCE TO RELATED APPLICATIONS

This application claims priority to U.S. Provisional Application No. 60/647,712, which was filed on Jan. 27, 2005, and which is fully incorporated herein by reference.

BACKGROUND OF THE INVENTION

1. Field of the Invention

The present invention relates generally to the field of processor-based imaging, and, more particularly, to invisible space skipping with adaptive granularity for texture-based volume rendering.

2. Description of the Related Art

Texture-based volume rendering has recently become the most popular volume rendering technique due to its performance advantage over software-based approaches (e.g., ray casting), and due to its cost advantage over customized hardware (e.g., VolumePro™). Volume rendering is notorious for being very computationally intensive. Even with modem graphics hardware, there is a desire, and indeed a need, to process relatively large datasets faster for standard texture-based volume rendering. Furthermore, the problem is compounded with the continual increase in the size of volume datasets.

Various approaches have been used to accelerate volume rendering (without compromising image quality) by ignoring portions of the volume that will not contribute to the resultant image. Li et al., *Accelerating Volume Rendering with Texture Hulls*, "IEEE/SIGGRAPH Symposium on Volume Visualization and Graphics", Boston, Mass., October 2002, pp. 115-122, Li et al., *Empty Space Skipping and Occlusion Clipping for Texture-based Volume Rendering*, "IEEE Visualization", December 2003, pp. 317-324, and Li et al. *Texture Partitioning and Packing for Accelerating Texture-based Volume Rendering*, "Graphics Interface", Halifax, Canada, 2003, pp. 81-88, the disclosures of which are fully incorporated by reference herein, decompose a volumetric dataset into sub-volumes during preprocessing to later facilitate skipping sub-volumes that are either completely transparent or completely occluded. These approaches all use a flat single-level geometric description of empty space. Other researchers have used hierarchical structures to skip empty space. Empty space has been based solely on voxels that are mapped to complete transparency by the transfer function.

SUMMARY OF THE INVENTION

A method of accelerating texture-based volume rendering is provided. The method includes (a) building a plurality of levels of granularity comprising a plurality of sub-volumes organized in a hierarchical structure, wherein the hierarchical structure is ordered top-down from a coarsest level of granularity to a finest level of a granularity; (b) determining a visibility factor for each of the plurality of sub-volumes, wherein the visibility factor represents a ratio of visible voxels in the corresponding sub-volume; (c) traversing the plurality of sub-volumes top-down from the coarsest level of granularity to the finest level of granularity; and (d) while traversing each of the plurality of sub-volumes in step (c), rendering the corresponding sub-volume and skipping all children of the rendered sub-volume, if the visibility factor is greater than given threshold.

A machine-readable medium having instructions stored thereon for accelerating texture-based volume rendering is provided. The method includes (a) building a plurality of levels of granularity comprising a plurality of sub-volumes organized in a hierarchical structure, wherein the hierarchical structure is ordered top-down from a coarsest level of granularity to a finest level of a granularity; (b) determining a visibility factor for each of the plurality of sub-volumes, wherein the visibility factor represents a ratio of visible voxels in the corresponding sub-volume; (c) traversing the plurality of sub-volumes top-down from the coarsest level of granularity to the finest level of granularity; and (d) while traversing each of the plurality of sub-volumes in step (c), rendering the corresponding sub-volume and skipping all children of the rendered sub-volume, if the visibility factor is greater than given threshold.

BRIEF DESCRIPTION OF THE DRAWINGS

The invention may be understood by reference to the following description taken in conjunction with the accompanying drawings, in which like reference numerals identify like elements, and in which:

FIG. 3 depicts a table identifying the properties that must be updated when a viewing parameter is changed, in accordance with one exemplary embodiment of the present invention.

DETAILED DESCRIPTION OF PREFERRED EMBODIMENTS

Figure 1:
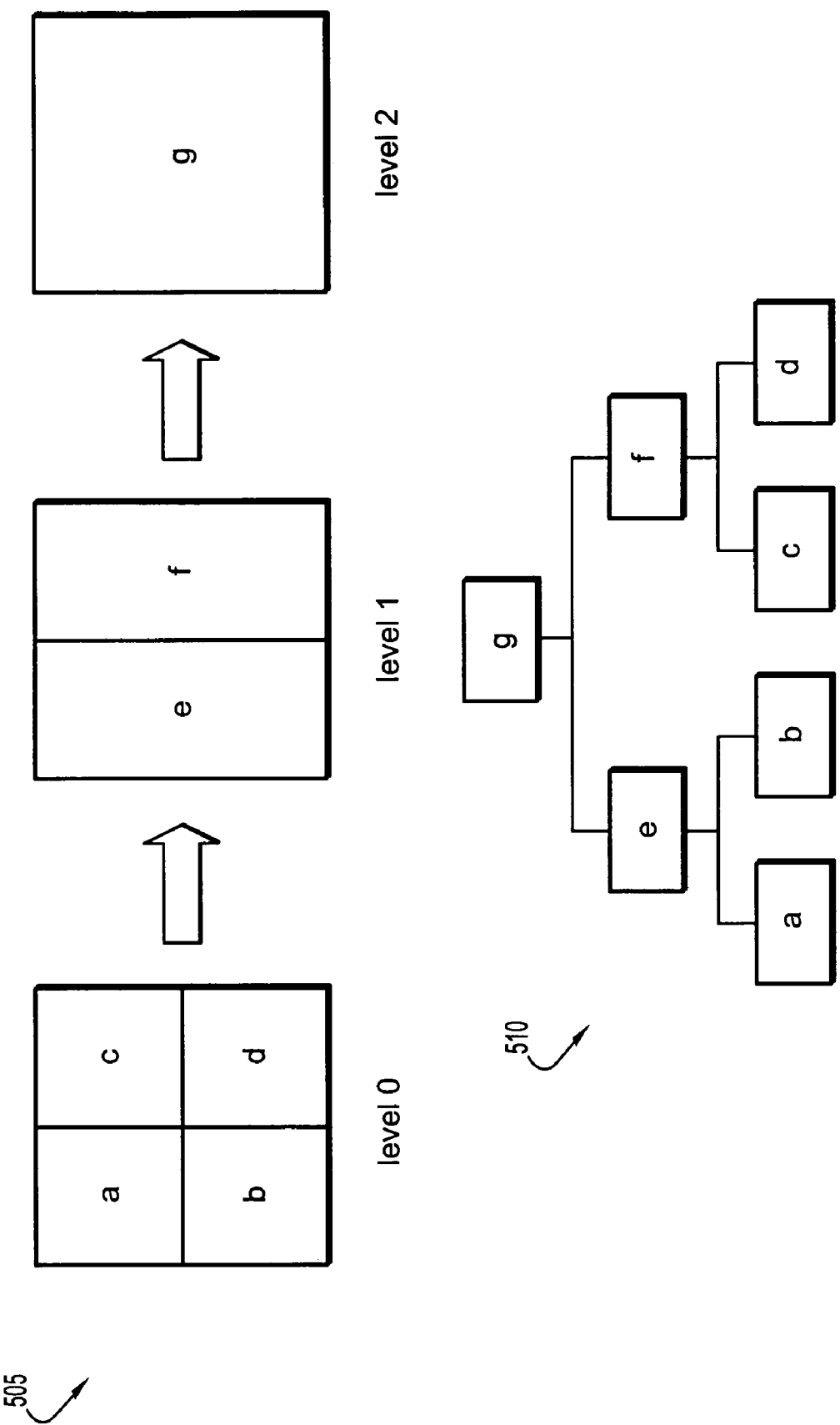
FIG. 1 depicts a simple recursive bottom-up partitioning of 2D space and the resultant BSP representation of the space, in accordance with one exemplary embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

The present invention accelerates volume rendering by decomposing a volumetric dataset to be rendered into subvolumes that are rectangular boxes called blocks, and by only rendering and possibly even loading blocks that will contribute to the final rendering. The set of blocks not contributing to the final rendering is referred to as invisible space. Blocks are organized hierarchically to provide the basis for deriving an efficient representation of space for the current viewing parameters. The expected performance gain over the approach without invisible space skipping is approximately four-fold without altering image quality—it is an average that depends on the data and viewing parameters (such as the transfer function and the viewing angle).

Hierarchical Organization of Blocks

Blocks are organized hierarchically using a tree structure where each node is associated with a single block. Leaf nodes correspond to blocks with the finest granularity; that is, the leaf nodes are the smallest units that are either rendered or skipped. These blocks are defined by uniformly dividing the volume along the largest dimension and preserving the alignment with the original dataset. The number of nodes in the first (or bottom) level is an integer power of two, which provides a fully balanced binary tree. A fully balanced binary tree provides the following benefits: identifying a leaf node only requires a single child to be tested, providing better consistency for search (by minimizing the expected number of searches), and providing more efficient storage (an interior node cannot have a null pointer). Neighboring blocks are merged to create blocks with coarser granularity (and remain rectangular boxes), which are larger and reside at higher levels of the tree. This step builds the second finest level of granularity. The process is repeated until the coarsest granularity contains only a single block that encompasses the original volume. This data structure is known as binary space partitioning tree, or BSP tree. The appropriate granularity of blocks used for rendering is obtained by moving up or down levels of the BSP tree. Other hierarchical data structures, such as an octree could also be used to organize the blocks. The BSP tree, however, is desirable because it is effective for fitting data and has a relatively low overhead for memory required to represent the hierarchy.

Referring to FIG. 1, a simple recursive bottom-up partitioning of two-dimensional ("2D") space 105 and the resultant BSP representation of the space 110 is shown. Although not so limited, a 2D depiction of space is used because it is simpler to understand (and portray), However, it should be appreciated that a BSP tree can be used for any dimensionality of space.

Performance Factors

The size of the blocks affects both central processing unit ("CPU") performance and graphics processing unit ("GPU") performance. CPU performance is affected by the efficacy of the BSP tree in classifying invisible blocks, as well as the overhead associated with accessing the BSP tree. The efficacy of the BSP tree is based on the benefit of skipping a block (which is proportional to the block size) and the likelihood of a block being skipped (which is inversely proportional to the block size). These contending issues depend on the volume being rendered and the viewing parameters, such as the transfer function used to interpret the volume and the viewing direction. The overhead of the BSP tree increases with the number of blocks due to the number of indirections involved per search, and the effect on the cache. The size of the blocks (which is inversely proportional to the number of blocks) also affects the load balance between the vertex and the fragment processor of GPUs—the number of vertices processed by the vertex processor is directly related to the number of blocks. Therefore, to facilitate both performance and usability, the block size is determined adaptively.

Invisible Space Skipping with Adaptive Granularity

In the present invention, each node of the BSP tree summarizes information about a block. Exemplary information about a block includes the identity of the associated block, a decomposition of the block at a finer resolution (two child nodes), and the effect of each of the viewing parameters on the block called properties. The ensemble of properties is used to determine the visibility factor of the corresponding block. The following properties are considered:

Opaqueness: the ratio of voxels that are not mapped to either complete transparency by the transfer function.

Unoccludedness: the ratio of voxels that are not occluded. Shading is not explicitly considered for occlusion; however, it affects occlusion because shading increases the degree of occlusion.

Unclippedness: the ratio of voxels that are not excluded (i.e., clipped) by clip-planes. The viewing frustum is implicitly represented by clip planes; therefore, the field of view is also handled by clip planes.

Uncroppedness: the ratio of voxels that are not excluded (i.e., cropped) by a crop box.

Segmentedness: the ratio of voxels that are specified by a 3D mask (such as an irregular volume of interest).

All of these properties are expressed as ratios in the range [0-1], with an initial value of 1. Properties are affected by various viewing parameters, such as the transfer function, viewing direction, clip planes, and the like. An aggregate visibility relevance factor, simply called visibility, is used to determine invisible space skipping and its granularity, and is computed as:

$$\text{visibility} = \min(\text{opaqueness}, \text{unoccludedness}, \text{unclippedness}, \text{uncroppedness}, \text{segmentedness}, V_p, V_c)$$

Where:

$V_p$ is the visibility relevance factor derived from the parent. It is 1 when there is no parent node (i.e., it is the root); otherwise, it is the visibility factor of its parent.

$V_c$ is the visibility relevance factor derived from the immediate children. It is 1 when the node has no children (i.e., it is a leaf); otherwise, it is the average visibility factor of the immediate children.

The renderer traverses the tree, starting from the root node, searching for appropriate nodes to render. The search is controlled by parameters associated with the tree of blocks, namely:

VisibleThreshold, which corresponds to the amount of invisible space and thus controls the granularity of blocks and varies with shaded and unshaded volume rendering. A typical exemplary value is 0.75.

InvisibleThreshold provides a quality performance tradeoff, where image quality is preserved with a value of 0.

The rules for rendering a tree of blocks are codified using the following pseudo code:

```
RenderTree(node)
{
    # node is a node of the BSP tree - initially the root.
    if (visibility of node >= VisibleThreshold of tree)
    {
        render node;
        skip all child nodes;
    }
    else if (visibility of node <= InvisibleThreshold of tree)
    {
        skip current node and all of its children;
    }
    else
    {
        recursively process direct children;
        # if necessary, the children are processed in visibility order
    }
}
```

Invisible space skipping also applies to texture loading. When a dataset is too large to fit completely into graphics memory and must be transferred every frame, it is prudent to avoid transferring blocks that will not contribute to the final rendering. Depending on the cost and overhead of uploading texture, the granularity for loading can be different from the granularity for rendering, although it is determined using the same block tree and the visibility factor, but should not be at finer levels. Any sub-volume being rendered is enclosed by a sub-volume already loaded. Neighboring bricks have an overlap to ensure proper interpolation during rendering. The sampling position is offset by half voxel to reduce the overlapping by one voxel. For unshaded rendering, the brick is expanded by 1 voxel on the high end while no expansion on the low end (the standard way is to expand 1 voxel on each end). For shaded rendering that computes gradients on-the-fly, two-voxel expansion on the high end and one voxel on the low end (the standard way is to expand two voxel on each end).

The concept of high end and low end is as follows. Assume that a brick extends along the X-axis from voxel 100 to voxel 200. The side of the brick along voxel 100 is the low end, and the side of the brick along voxel 200 is the high end. Each brick will have three low ends and three high ends because a brick is three-dimensional.

Figure 2:
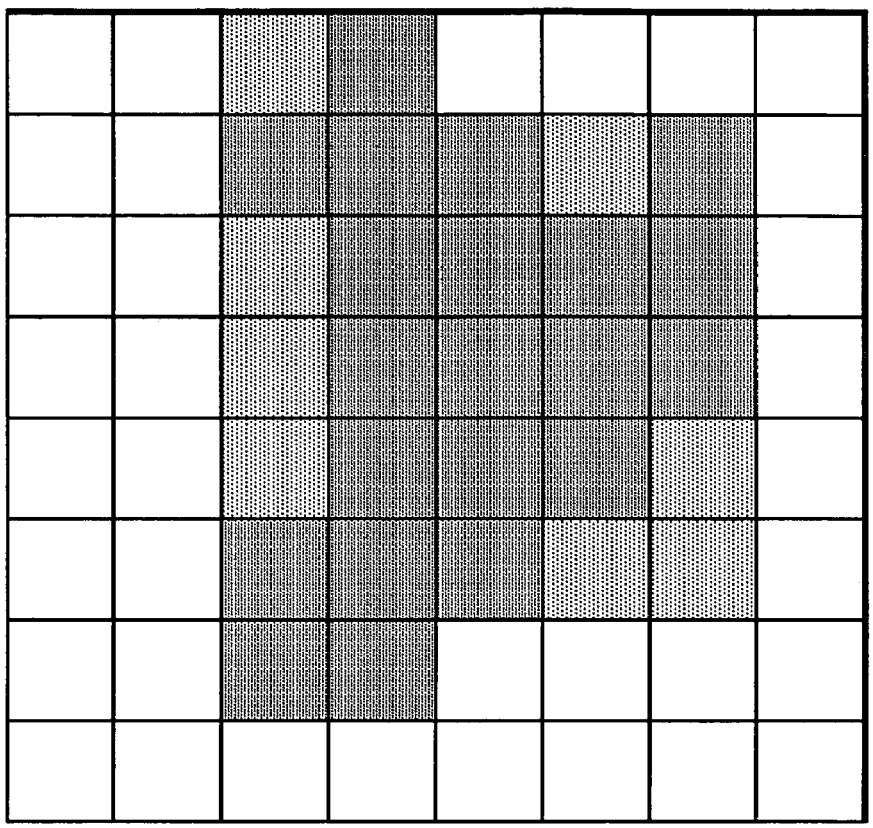
FIG. 2 depicts a grid illustrating the loading of blocks, in accordance with one exemplary embodiment of the present invention.
Figure 2:
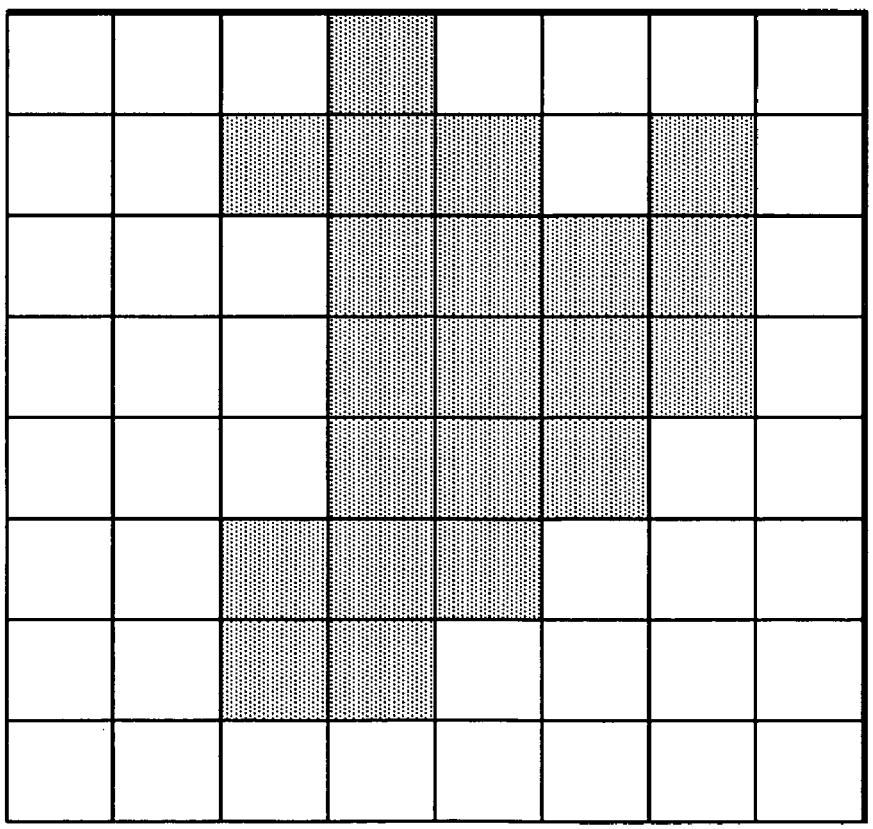

FIG. 2 shows a possible means of loading blocks when the cost of transferring data from the CPU to the GPU depends on the number of transfers made. FIG. 2(a) shows the grid of data, where shaded cells indicate visible data (unshaded cells are invisible). FIG. 2(b) is a reproduction of FIG. 2(a) in which superimposed hatching is used to indicate the actual blocks that were transferred (and the hatch style indicates the particular transfer—two transfers are depicted in this example).

Updating Node Properties

The node properties, as well as the derived visibility, are updated whenever certain viewing parameters change. Referring now to FIG. 3, a table is shown, which identifies the properties that must be updated when a viewing parameter is changed.

There are two approaches for updating the properties of each node. The most basic approach is to compute the property values for all leaf nodes, and then propagate the values up through the tree until all nodes are updated. This approach provides the finest granularity. However, to mitigate the cost of properties that are relatively expensive to compute, a variant approach is to compute the properties of some interior nodes, which yields a coarser granularity. Then the properties are propagated both up and down the tree.

The propagation rule is as follows. A node derives its property value from either its children or parent depending on the direction of propagation. If the propagation is upwards, then the property of the parent is the average of the properties of its direct children. Otherwise, when the propagation is downwards, the property of the node is propagated to its direct children. Properties that change infrequently are typically updated at the finest granularity for better accuracy, while properties that change frequently are updated at a coarser granularity. For example, Opaqueness, which depends only on the transfer function (which does not change very frequently), is updated at the finest granularity; while Unoccludedness, which depends on all the viewing direction, is updated at a coarser granularity.

Adaptive Granularity for Property Updating

The granularity of property updating can be adjusted automatically—especially for those properties that change frequently, such as Unoccludedness, which may require updating every frame when the volume is rotated. Assuming there is strong coherence between consecutive updates, the updating granularity is adjusted locally at each tree node that is updated directly. When the assumption does not hold, then there can be a minor reduction in performance without affecting the resultant image quality. When two neighboring nodes were updated the previous time and the corresponding property values of both nodes are either greater than a solid threshold or less than an empty threshold, then the property of their parent is computed directly for the current update. The total number of direct computations for the property is reduced by one for each such adjustment. When the property of a node was directly updated the previous time and the property value represents over 50% invisible voxels, then the property is computed at a finer granularity for that particular branch, by computing the properties for the direct children of the node. Each such adjustment increases the total number of direct computations of the property by one. Otherwise, the updating of granularity along a tree branch remains unchanged.

Occlusion

An occlusion query, such as that provided by OpenGL, is used to determine whether a block is fully occluded and therefore can be skipped. The query is accomplished by rendering the front faces of the bounding box of a block as untextured solid polygons to ascertain the number of entries modified in the frame buffer. Depending on both the viewing direction and type of viewing projection (i.e., orthogonal or perspective), up to three front faces are rendered.

Figure 4:
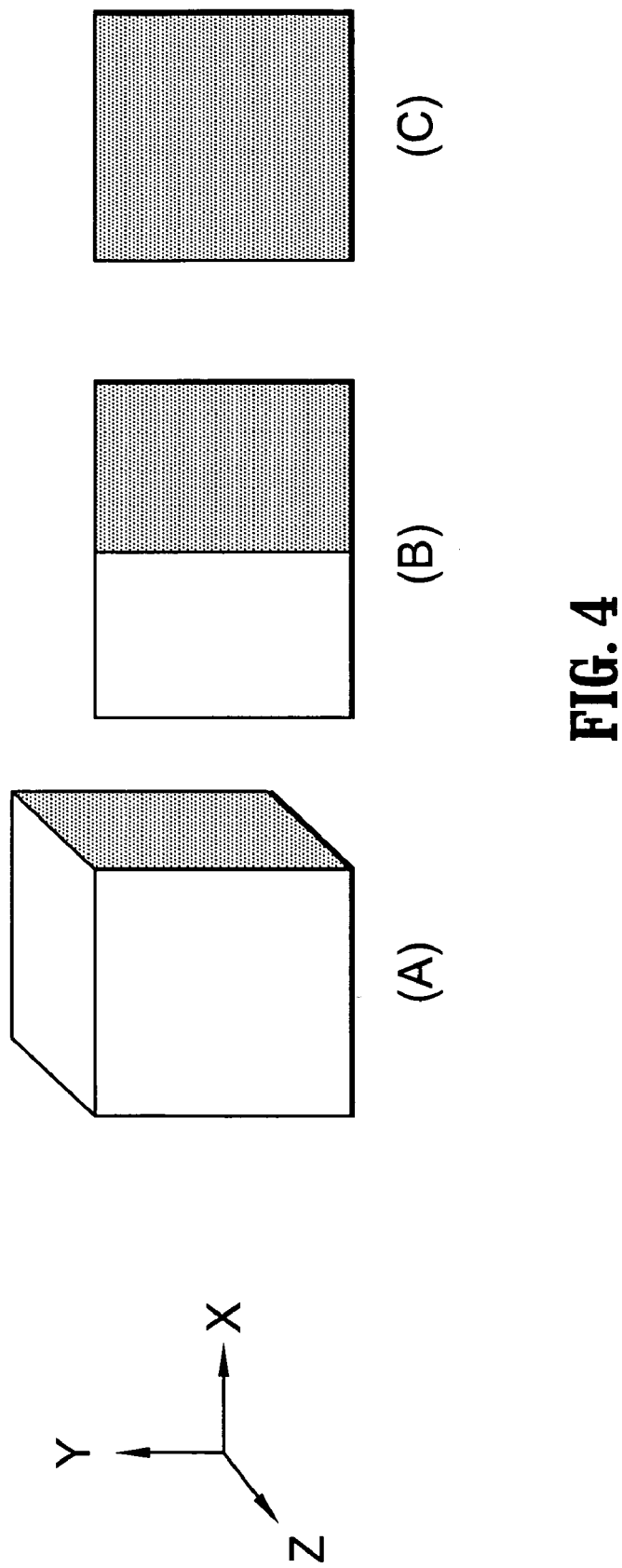
FIG. 4 depicts three graphical representations of a block illustrating how the number of faces of a block that are potentially visible to an observer depends on the viewing direction, in accordance with one exemplary embodiment of the present invention.

FIG. 4 illustrates how the number of faces of a block that are potentially visible to an observer depends on the viewing direction. The first view (A) shows a schematic representation of a block where the maximum of three faces are visible. The face on the YZ plane is shaded to serve as a reference landmark. The second view (B) shows the same block looking directly at the common edge for the faces on the XY and YZ planes where only two faces are visible. The third view (C) shows the same block looking directly at the face on the YZ plane where only one face is visible.

The query is implemented using a fragment program that evaluates the frame buffer entry corresponding to a fragment; specifically, fragments whose alpha (i.e., opacity) component exceeds a specified threshold (typically very close to 1) are discarded because they are occluded. The graphics hardware maintains an internal counter of the number of fragments that reach the frame buffer (i.e., are not discarded). Only a single fragment is used per pixel because the solid polygons that are used have no thickness and are not blended. The query returns the number of pixels that reaches the frame buffer—0 indicates that a block is completely occluded. To prevent altering the contents of the frame buffer all color masks and depth masks are deactivated before executing the query. The query can be based on rendering to either the frame buffer, or into a RenderTexture object. Frame buffer-based queries can be accelerated by copying a portion of the frame buffer to a texture. The portion of the frame buffer to copy is determined from the projection of the block's bounding box. Occlusion information is obtained beforehand, rather than on-demand. It is much more efficient to batch multiple queries before retrieving results than to interlace individual queries and responses, because it facilitates flow through the pipeline by avoiding blocking stalls associated with each retrieval.

The pixel count is used to estimate the ratio of voxels that are occluded, which is computed as:

$$unoccludedness = \frac{PixelCount}{FrontFacePixels}$$

Where:
PixelCount is the value derived from the occlusion query.
FrontFacePixels is the total number of pixels for the front faces (independent of occlusion). Although this value could be obtained from an occlusion query, it is too expensive to be applied for each block. Instead, it is computed for each of the three-face orientations at the beginning of each frame of rendering.

The estimate of the ratio of voxels is based on the assumption that what applies to the face of the block applies to the block as a whole. The quality of the estimate affects the level of granularity used, which in turn affects the performance and not the quality of the rendered image. For an orthogonal projection, the ratio is a constant for each face orientation. For a perspective projection, the ratio changes with the distance of the block to the view point. However, for typical volume rendering, the change is very small, and can be ignored. It is more efficient to issue multiple occlusion queries at once before retrieving the results.

Accessing Tree Nodes

Choosing the proper granularity of blocks is an important aspect of the present invention. The granularity is significantly dependent on the tree structure. Various criteria are used to select relevant nodes. Therefore, for the code for accessing the tree structure should be both efficient and expendable.

Traversing the BSP tree is based on a blockfilter, which must provide two functions: accept and skip. The predicate function accept determines whether a node satisfies the criteria for it to be visible, while the predicate function skip avoids traversing the descendents of the specified node if the node is not accepted. The following is the pseudo-code for slice-by-slice space leaping.

```
boolean accept(node)
{
    # node is a node of the BSP tree
    # SolidThreshold: solid threshold for the tree
    # VisibilityThreshold: visibility threshold for the tree
    # NonOcclusionThreshold: non occlusion threshold for the tree
    if (node is not within optional clip planes) return FALSE;
    if (node is not within optional crop box) return FALSE;
    if ((solidness of node >= SolidThreshold) AND
        (visibility of node >= VisibilityThreshold)) return TRUE;
    if ((node is a leaf) AND
        (solidness of node >= NonEmptyThreshold) AND
        (visibility of node >= NonOcclusionThreshold)) return TRUE;
    return FALSE;
}
boolean skip (node)
{
    # See comments for accept
    if (node is accepted) return TRUE; # use accept.
    if (solidness of node <= NonEmptyThreshold) return TRUE;
    if (visibility of node <= NonOcclusionThreshold) return TRUE;
    if (node is not completely within optional clip planes) return TRUE;
    if (node is not completely within optional crop box) return TRUE;
    return FALSE;
}
```

The above exemplary implementation is independent of a particular programming language. Although not so limited, C++ provides features that are particularly well-suited for implementing the present invention. A common iterator maintains an internal stack whose top is the next qualified node, if the stack is not empty. The ++ operator moves the next qualified tree node to the top of the stack, and uses both the accept and skip methods. The filter is passed to the iterator using a template. Furthermore, the filter methods accept and skip are called frequently during the tree traversal are defined as inline methods, instead of virtual methods.

Figure 5:
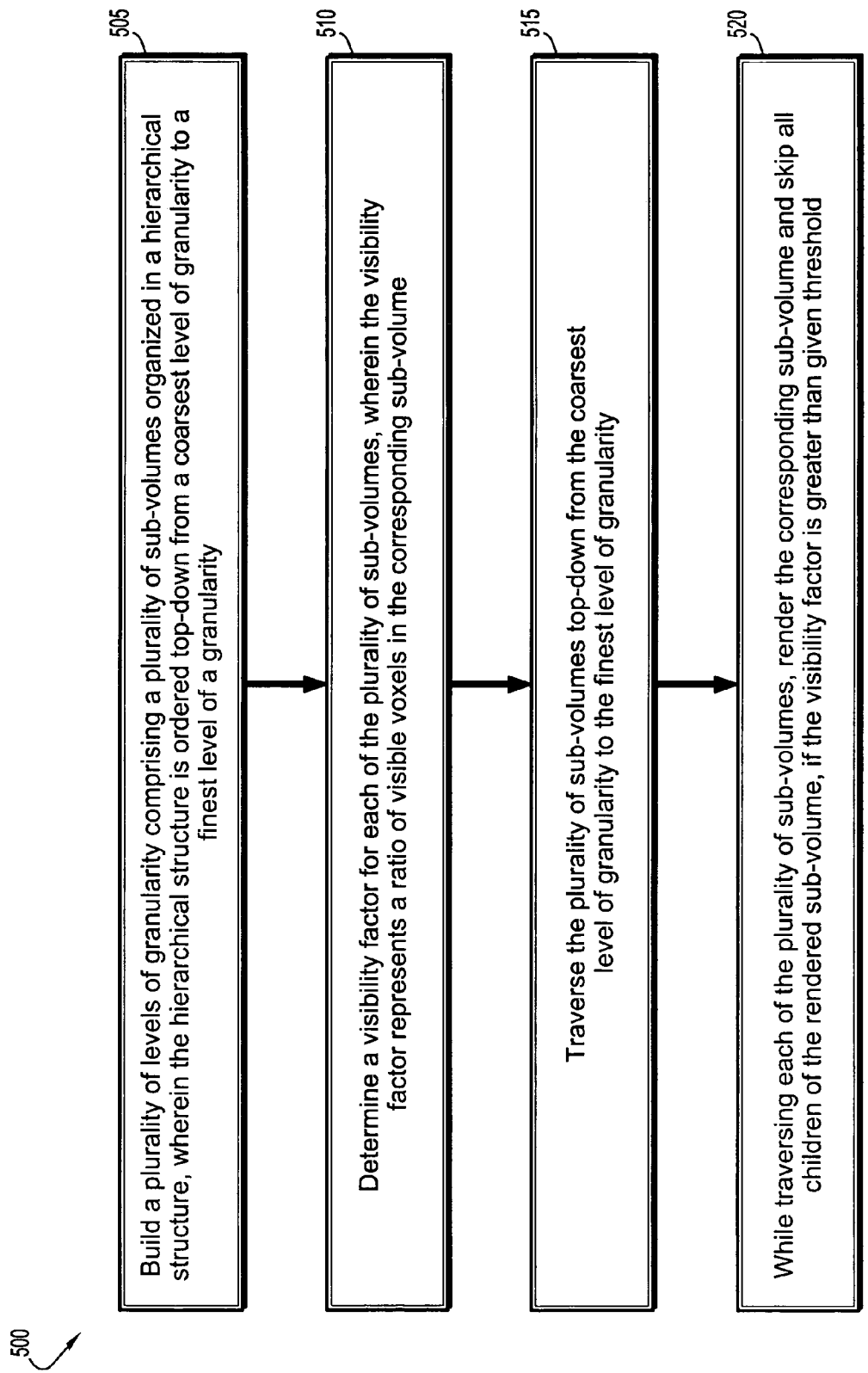
FIG. 5 depicts a flow diagram illustrating a flow diagram illustrating method of accelerating texture-based volume rendering, in accordance with one exemplary embodiment of the present invention.

Referring to FIG. 5, a flow diagram illustrating method of accelerating texture-based volume rendering is provided. The method includes the following steps. A plurality of levels of granularity comprising a plurality of sub-volumes organized in a hierarchical structure are built (at 505). The hierarchical structure is ordered top-down from a coarsest level of granularity to a finest level of a granularity. A visibility factor is determined (at 510) for each of the plurality of sub-volumes. The visibility factor represents a ratio of visible voxels in the corresponding sub-volume. The plurality of sub-volumes are traversed (at 515) top-down from the coarsest level of granularity to the finest level of granularity. While traversing each of the plurality of sub-volumes, the corresponding sub-volume is rendered and all children of the rendered sub-volume are skipped (at 520), if the visibility factor is greater than given threshold.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of accelerating texture-based volume rendering, comprising:
   (a) building a plurality of levels of granularity comprising a plurality of sub-volumes organized in a hierarchical structure, wherein the hierarchical structure is ordered top-down from a coarsest level of granularity to a finest level of a granularity;
   (b) determining a visibility factor for each of the plurality of sub-volumes, wherein the visibility factor represents a ratio of visible voxels in the corresponding sub-volume;
   (c) traversing the plurality of sub-volumes top-down from the coarsest level of granularity to the finest level of granularity; and
   (d) while traversing each of the plurality of sub-volumes in step (c), rendering via a processor the corresponding sub-volume and skipping all children of the rendered sub-volume, if the visibility factor is greater than a given threshold.

2. The method of claim 1, further comprising:
   if a volume comprising the plurality of sub-volumes is bricked, loading the plurality of sub-volumes from a main memory to a graphics memory with adaptive granularity,
   wherein the step loading is performed if the corresponding visibility factor is greater than a loading threshold; and
   wherein the step of loading is performed with the same or coarser level of granularity as step (d).

3. The method of claim 2, wherein the step of loading the plurality of sub-volumes, comprises:
   overlapping neighboring bricks to ensure proper interpolation during rendering.

4. The method of claim 3, wherein the step of loading the plurality of sub-volumes, further comprises:
   offsetting a sampling position by a half voxel to reduce the overlapping by one voxel.

5. The method of claim 3, wherein the step of loading the plurality of sub-volumes, further comprises:
   if the rendering at step (d) is unshaded, expanding the brick by one voxel on a high-end with no expansion on a low end; and
   if the rendering at step (d) is shaded and computes gradients on-the-fly, expanding the brick by two voxels on the high-end and one voxel on the low end.

6. The method of claim 1, wherein the visibility factor represents a percentage of visibly voxels in the corresponding sub-volume.

7. The method of claim 1, wherein the step of determining a visibility factor for each of the plurality of sub-volumes, comprises:
   combining a plurality of properties associated with the corresponding sub-volume to determine the visibility factor.

8. The method of claim 1, wherein the step of determining a visibility factor for each of the plurality of sub-volumes, comprises:
   computing the visibility factor for a first portion of the plurality of sub-volumes;
   propagating respective property values of said parent and child sub-volumes for a remaining portion of the plurality of sub-volumes; and
   during the step of propagating, updating the visibility factor for the corresponding sub-volume.

9. The method of claim 1, wherein the step of traversing the plurality of sub-volumes, comprises:
   utilizing a common iterator and a plurality of replaceable filters for efficient selection of sub-volumes in traversal.

10. The method of claim 9, further comprising:
    adding new filters with new sub-volume selection criteria without changing the common integrator and the plurality of replaceable filters.

11. The method of claim 9, wherein the common integrator and the plurality of replaceable filters are implemented with an inline method.

12. The method of claim 9, wherein the common integrator and the plurality of replaceable filters are implemented with C++ templates.

13. The method of claim 1, wherein the step of determining a visibility factor, comprises:
    determining a visibility factor with adaptive granularity.

14. A program storage device having instructions stored thereon for accelerating texture-based volume rendering, comprising:
    (a) building a plurality of levels of granularity comprising a plurality of sub-volumes organized in a hierarchical structure, wherein the hierarchical structure is ordered top-down from a coarsest level of granularity to a finest level of a granularity;
    (b) determining a visibility factor for each of the plurality of sub-volumes, wherein the visibility factor represents a ratio of visible voxels in the corresponding sub-volume;
    (c) traversing the plurality of sub-volumes top-down from the coarsest level of granularity to the smoothest level of granularity; and
    (d) while traversing each of the plurality of sub-volumes in step (c), rendering the corresponding sub-volume and skipping all children of the rendered sub-volume, if the visibility factor is greater than a given threshold.

* * * * *